Patented May 25, 1937

2,081,676

UNITED STATES PATENT OFFICE 2,081,676

PREPARATION OF STARCH-DEGRADING ENZYMES

Wilhelm Neugebauer, Wiesbaden-Biebrich, Germany, assignor to Kalle & Co. Aktiengesellschaft, Wiesbaden-Biebrich, Germany, a corporation of Germany No Drawing. Application November 4, 1932, Serial No. 641,316. In Germany November 14, 1931

3 Claims. (Cl. 195—68)

My present invention relates to preparations of starch-degrading enzymes, particularly to preparations destined to be used as desizing agents.

I have found that preparations of starch-degrading or starch-liquefying pancreatic enzymes of enhanced activity are obtained by adding to them a salt or a mixture of salts of pyrophosphoric acid. Only very small quantities of such salts are required to produce an activation, for example, one part by weight of a pyrophosphate is sufficient to activate from 10,000 to 100,000 parts of an amylase solution. These salts may be admixed to the dry commercial enzyme preparations or may be added to the solutions of the enzyme preparations for instance the usual desizing solutions. The salts may be formed from this acid with metals, such as sodium, potassium, calcium, magnesium, or the like, or with ammonium. The optimal hydrogen-ion-concentration can be adjusted in the solutions in known manner. If desired, activators, such as sodium chloride, stabilizers, buffer substances or other usual additions either alone or in mixture with one another may be added to the solutions or dry preparations.

The enzyme preparations containing an addition of the said salts have an enhanced activity, as already above mentioned. This may be noted when the preparations are used for desizing starch-containing materials; the material is better and more rapidly desized with the aid of the preparations according to my present invention than with the aid of the known preparations. The action in this case is not a buffering action, since the activation can also be observed at the hydrogen-ion-concentration which is optimal for the amylase.

It is surprising that the action of amylases is enhanced by the addition of salts of phosphoric acids, particularly in view of the fact that other enzymes, such as di-peptidases, poly-peptidases and pancreas trypsin are considerably weakened by pyrophosphoric acid salts (cf. Hoppe-Seyler "Zeitschrift für physiologische Chemie", volume 186, pages 186 and 187).

The following examples illustrate my invention:

1. In 1000 liters of water there are dissolved 100 grams of sodium pyrophosphate and 1 kilo of a pancreas amylase preparation such as is sold for desizing purposes. Cotton containing a starch size is treated with the solution so obtained at about 45° C. in the usual manner. The starch is degraded more rapidly than in another lot of cotton which has been treated in the same manner, but without addition of a pyrophosphate.

2. 100 grams of pancreatin, 900 grams of sodium chloride and 20 grams of tri-sodium pyrophosphate are mixed in a suitable device. The mixture is a good desizing agent for materials containing starch-sizes.

3. To a dilute solution of bacteria amylase there are added 0.01 per cent. of tri-sodium pyrophosphate. The starch-degrading action is greater than in a bacteria amylase solution which does not contain tri-sodium pyrophosphate.

4. 100 grams of pancreatin, 900 grams of sodium chloride, 20 grams of trisodium pyrophosphate and 30 grams of calcium formate are mixed with one another. A good desizing agent is thus obtained.

5. In 1000 liters of water there are dissolved 200 grams of pancreatin, 100 grams of trisodium pyrophosphate, 100 grams of the acid calcium-magnesium salt of inosite hexaphosphoric acid and 2 kilos of ammonium chloride. Cotton tissue containing a starch size is treated with the solution so obtained at about 45° C. in known manner. The starch disappears more rapidly than without the addition of trisodium pyrophosphate and inosite hexaphosphate.

In place of the tri-sodium pyrophosphate employed in the preceding Examples 2, 3, 4 and 5 one may employ an equimolecular mixture of tetrasodium pyrophosphate and disodium pyrophosphate with equal effect.

I claim:

1. The method of activating pancreatic amylase in the degradation of starch which comprises adding to the amylase preparation a substance selected from the group consisting of the alkali metal salts and alkaline earth metal salts of pyrophosphoric acid.

2. The method of activating pancreatic amylase in the degradation of starch which comprises adding to the amylase preparation a sodium pyrophosphate.

3. The method of activating pancreatic amylase in the degradation of starch which comprises adding to the amylase preparation tri-sodium pyrophosphate.

WILHELM NEUGEBAUER.